US007850772B2

(12) United States Patent
Li et al.

(10) Patent No.: US 7,850,772 B2
(45) Date of Patent: Dec. 14, 2010

(54) PRODUCT STABILITY ENHANCEMENT WITH PHOSPHONIUM SALTS

(75) Inventors: Minyu Li, Oakdale, MN (US); Kim Person Hei, Baldwin, WI (US); Joy G. Herdt, Hastings, MN (US); Amy Haupert, Saint Paul, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 12/435,006

(22) Filed: May 4, 2009

(65) Prior Publication Data

US 2009/0215656 A1 Aug. 27, 2009

Related U.S. Application Data

(63) Continuation of application No. 09/571,121, filed on May 12, 2000, now Pat. No. 7,527,745.

(51) Int. Cl.
*C09D 5/16* (2006.01)
*C09D 5/18* (2006.01)

(52) U.S. Cl. ................................ 106/18.31; 106/15.05

(58) Field of Classification Search ............. 106/15.05, 106/18.31; 509/421, 161
See application file for complete search history.

(56) References Cited

U.S. PATENT DOCUMENTS

| | | | | | |
|---|---|---|---|---|---|
| 4,673,509 | A | * | 6/1987 | Davis et al. | 210/699 |
| 4,874,526 | A | | 10/1989 | Grade et al. | |
| 5,062,979 | A | | 11/1991 | Scharf et al. | |
| 5,102,874 | A | * | 4/1992 | Lintner et al. | 514/75 |
| 5,174,914 | A | | 12/1992 | Gutzmann | |
| 5,403,505 | A | * | 4/1995 | Hachmann et al. | 510/383 |
| 5,462,681 | A | * | 10/1995 | Gutzmann et al. | 508/513 |
| 5,565,127 | A | | 10/1996 | Laufenberg et al. | |
| 5,641,480 | A | | 6/1997 | Vermeer | |
| 5,961,054 | A | | 10/1999 | Nishibori | |
| 6,207,622 | B1 | | 3/2001 | Li et al. | |
| 6,214,777 | B1 | | 4/2001 | Li et al. | |

FOREIGN PATENT DOCUMENTS

| | | |
|---|---|---|
| CA | 2082994 | 5/1993 |
| EP | 332578 | 9/1989 |
| EP | 0549006 | 6/1993 |
| JP | 2000-063243 | 2/2000 |
| WO | WO92/13048 | 8/1992 |

OTHER PUBLICATIONS

*Concise Encyclopedia of Science & Technology, 4th Edition*, McGraw-Hill, (1998), pp. 1931-1932.

* cited by examiner

*Primary Examiner*—Michael C Miggins
(74) *Attorney, Agent, or Firm*—Andrew D. Sorensen; Laura C. Dilorenzo; Amy J. Hoffman

(57) ABSTRACT

The present invention provides a beverage surfactant composition that includes a surfactant, a phosphonium compound, and a carrier; wherein the beverage surfactant composition exhibits stability as a solution or as a dispersion at a temperature of about 0 EC to about 8 EC. The present invention also provides a container or a conveyor for a container having a surface that is at least partially coated with the composition. The present invention also provides a process for lubricating a container that includes contacting at least a portion of a surface of the container and the composition together. The present invention also provides a process for lubricating a conveyor that includes contacting at least a portion of a surface of the conveyor and the composition together.

16 Claims, No Drawings

PRODUCT STABILITY ENHANCEMENT WITH PHOSPHONIUM SALTS

CROSS-REFERENCE TO RELATED APPLICATION

This application is a continuation of application Ser. No. 09/571,121 filed May 1, 2000 and issued as U.S. Pat. No. 7,527,745, the contents of which are incorporated by reference herein.

BACKGROUND OF THE INVENTION

Containers are commonly used in the food and beverage industry to hold and store the food or beverage. In the commercial distribution of many food products, including many beverages, the products are packaged in cartons, cans, bottles, Tetra Pak® packages, or wax carton packs of varying sizes. In addition, the containers are usually manufactured from many different types of materials, such as metals, glasses, ceramics, papers, treated papers, waxed papers, polymeric materials, composites, and layered structures. The polymeric material typically includes polyolefins (e.g., polyethylene, polypropylene, polystyrene, and mixtures thereof), polyesters (e.g., polyethylene terephthalate (PET), polyethylene naphthalate (PEN) and mixtures thereof), polyamides, and/or polycarbonates.

In most packaging operations, the containers are moved along conveying systems, usually in an upright position, with the opening of the container facing vertically up or down. The containers are moved from station to station, where various operations, such as filling, capping, labeling, sealing, and the like, are performed. Lubricants are often used in conveying systems for containers to ensure the appropriate movement of containers on the conveyor. Specifically, the lubricating solutions are often used on conveying systems during the filling of the containers, for example, with beverages.

There are a number of different properties that are desirable for beverage lubricant compositions. For example, the lubricant composition should provide an acceptable level of lubricity for the system. It is also desirable that the lubricant composition have a viscosity that allows it to be applied by conventional pumping and/or application apparatus (e.g., spraying, roll coating, or wet bed coating). In addition, in the beverage industry, there is a high demand for conveyor lubricant compositions that are beverage compatible. Beverage compatibility refers to the lubricant composition not forming solid deposits when it accidentally contacts spilled beverages on the conveyor system. This property is important since the formation of deposits on the conveyor system can change the lubricity of the system and could require shut-down of the equipment to facilitate cleaning.

Carbonated beverages usually contain ingredients with anionic charges, such as colors and flavors, which are held in solution through emulsification. Given this generally negative charge, the cationic constituents of a synthetic lubricant, such as quaternary ammonium salts, amines, and ether amines, may react with the beverage to form precipitates. The precipitates accumulate on conveyors, housing, and floors as a tenacious soil, and may cause a halt in production to facilitate cleaning.

When the lubricant composition is for use on PET bottle lines, acceptable compatibility with PET is desired. Currently, containers, including PET bottles, and/or the conveying system are often coated with an aqueous-based lubricant composition to provide lubricity to the container so that it can more easily travel down a conveyor system. Many currently used aqueous-based lubricant compositions are less than desirable because they are incompatible with many beverage containers, such as PET and other polyalkylene terephthalate containers, and may lead to stress cracking and rupture of the PET bottles.

Many of the known beverage lubricant compositions, upon cooling to about 0° C., form a precipitate in the container. The precipitate usually requires a significant amount of heating and/or agitation to redissolve the precipitate into solution. As such, the presence of a precipitate in the beverage lubricant compositions is undesirable to consumers.

Lubricant compositions having quaternary ammonium agent and phosphate esters are known to have good lubricity. However, mixing of certain ratios of the quaternary ammonium compound and soft drink spillage usually contribute to soiling of the beverage.

Lubricant compositions having fatty acids are known to have good lubricity, especially for metal surface lubrication. However, fatty acids generally need to be neutralized in order to have a good solubility in water. The use of sodium or potassium hydroxide as the neutralizing agent, in fatty acid containing lubricants, has been found to increase the alkalinity of the lubricant composition, and to thus contribute and promote the stress cracking in PET containers.

Additionally, many compositions currently used in the industrial and institutional industry do not exhibit stability over broad temperature ranges typically encountered with the shipping and storage of these compositions. Such compositions include, e.g., compositions useful in the cleaning, rinsing, lubricating, and antistatic fields. These compositions are typically transported and stored in unheated transportation vehicles (e.g., trucks) and stored in unheated units (e.g., sheds or warehouses). The lack of stability of these compositions can often be seen as a solidification (i.e., precipitation) of one or more components in the composition. This solidification can result, e.g., in a loss of homogeneity in pumping the composition, which can cause nozzle plugging. Removing and cleaning out plugged nozzels is time consuming, as well as financially expensive. Removing and cleaning out plugged nozzels can also effect product performance.

Currently, there is a need for a surfactant composition (e.g., lubricant composition) exhibiting stability as a solution or a dispersion at a temperature of about 0° C. to about 8° C. Such surfactant composition (e.g., lubricant composition) should exhibit beverage compatibility. In addition, the surfactant composition (e.g., lubricant composition) should exhibit compatibility with PET.

SUMMARY OF THE INVENTION

It has surprisingly been discovered that a surfactant composition (e.g., an antimicrobial lubricant composition) exhibiting stability as a solution or as a dispersion at a temperature of about 0° C. to about 8° C. can be obtained by the incorporation of a phosphonium compound into the composition. Moreover, unlike quaternary ammonium salts and other surfactants, the phosphonium compounds are believed to be relatively inert to PET bottle cracking. This provides the added benefit of improving the stability of pressurized PET bottles. Additionally, it has surprisingly been discovered that surfactant compositions containing phosphonium compounds do not form a soil with many types of beverages, such as carbonated beverages. The phosphonium compounds are also compatible with the usual components of surfactant compositions, such as those described hereinbelow.

The compositions of the present invention, upon cooling to about 0° C. (e.g., from about 0° C. to about 8° C.), may form a colloidal suspension or may form a dispersion with less freezing or with less crystal formation than known surfactant compositions that include water, one or more surfactants, one or more neutralizing agents, and/or one or more chelating agents. The compositions of the present invention will also require less agitation or will require less heating than known surfactant compositions that include water, one or more surfactants, one or more neutralizing agents, and/or one or more chelating agents, to redissolve any suspended particles in solution.

The present invention provides a composition including a surfactant, a phosphonium compound, and a carrier. The composition exhibits stability as a solution or as a dispersion at a temperature of about 0° C. to about 8° C. Preferably, the phosphonium compound is a quaternary phosphonium compound, such as tetrakis(hydroxymethyl) phosphonium sulfate.

The present invention also provides a composition including about 10 wt. % to about 70 wt. % of deionized water; up to about 10 wt. % of ethylenediaminetetraacetic acid; up to about 25 wt. % of a phosphate ester; up to about 10 wt. % of a quaternary ammonium salt; up to about 10 wt. % of an alcohol alkoxylate (e.g., ethoxylate); up to about 8 wt. % of an alkaline metal hydroxide or an alkyl amine; and about 1 wt. % to about 10 wt. % of tetrakis(hydroxymethyl) phosphonium sulfate; or a suitable salt thereof. The composition exhibits stability as a solution or a dispersion at a temperature of about 0° C. to about 8° C. Preferably, the composition includes at least 1 wt. % of a surfactant, at least 0.1 wt. % of a phosphonium compound, and at least 5 wt. % of a carrier.

The present invention also provides a composition including at least 1 wt. % of a surfactant, at least 0.1 wt. % of a phosphonium compound, and at least 5 wt. % of a carrier. The composition exhibits stability as a solution or as a dispersion at a temperature of about 0° C. to about 8° C. Preferably, the phosphonium compound is a quaternary phosphonium compound, such as tetrakis(hydroxymethyl) phosphonium sulfate.

The present invention also provides a container or a conveyor for a container. The container or conveyor for a container has a surface that is at least partially coated with a composition. The composition includes a surfactant, a phosphonium compound, and a carrier. In addition, the composition exhibits stability as a solution or a dispersion at a temperature of about 0° C. to about 8° C. Preferably, the phosphonium compound is a quaternary phosphonium compound, such as tetrakis(hydroxymethyl) phosphonium sulfate. The container is preferably a beverage container. In addition, the container is preferably made from polyethylene terephthalate.

The present invention also provides a process for lubricating a container. The process includes contacting at least a portion of a surface of the container and a composition together. The composition includes a surfactant, a phosphonium compound, and a carrier. In addition, the composition exhibits stability as a solution or as a dispersion at a temperature of about 0° C. to about 8° C. Preferably, the phosphonium compound is a quaternary phosphonium compound, such as tetrakis(hydroxymethyl) phosphonium sulfate. The container is preferably a beverage container. In addition, the container is preferably made from polyethylene terephthalate.

The present invention also provides a process for lubricating a conveyor. The process includes contacting at least a portion of a surface of the conveyor and a composition together. The composition includes a surfactant, a phosphonium compound, and a carrier. In addition, the composition exhibits stability as a solution or a dispersion at a temperature of about 0° C. to about 8° C. Preferably, the phosphonium compound is a quaternary phosphonium compound, such as tetrakis(hydroxymethyl) phosphonium sulfate. Preferably, the portion of the surface of the conveyor contacts a container. The container is preferably a beverage container. In addition, the container is preferably made from polyethylene terephthalate.

DETAILED DESCRIPTION OF THE INVENTION

The following definitions are used, unless otherwise described: halo is fluoro, chloro, bromo, or iodo. Alkyl, alkoxy, alkenyl, alkynyl, etc. denote both straight and branched groups; but reference to an individual radical such as "propyl" embraces only the straight chain radical, a branched chain isomer such as "isopropyl" being specifically referred to. Aryl denotes a phenyl radical or an ortho-fused bicyclic carbocyclic radical having about nine to ten ring atoms in which at least one ring is aromatic. Heteroaryl encompasses a radical attached via a ring carbon of a monocyclic aromatic ring containing five or six ring atoms consisting of carbon and one to four heteroatoms each selected from the group consisting of non-peroxide oxygen, sulfur, and N(O) wherein Q is absent or is H, O, ($C_1$-$C_4$)alkyl, phenyl or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto.

Specific and preferred values listed below for radicals, substituents, and ranges, are for illustration only; they do not exclude other defined values or other values within defined ranges for the radicals and substituents Specifically, ($C_1$-$C_{24}$)alkyl can be methyl, ethyl, propyl, isopropyl, butyl, iso-butyl, sec-butyl, pentyl, 3-pentyl, hexyl, heptyl, octyl, nonyl, dedcyl, undecyl, dodecyl, tridecyl, tetradecyl, or eicosyl; ($C_3$-$C_8$)cycloalkyl can be cyclopropyl, cyclobutyl, cyclopentyl, or cyclohexyl; ($C_1$-$C_{24}$)alkoxy can be methoxy, ethoxy, propoxy, isopropoxy, butoxy, iso-butoxy, sec-butoxy, pentoxy, 3-pentoxy, hexyloxy, heptoxy, octoxy, nonoxy, dedcoxy, undecoxy, dodecoxy, tridecoxy, tetradecoxy, or eicosoxy; ($C_2$-$C_6$)alkenyl can be vinyl, allyl, 1-propenyl, 2-propenyl, 1-butenyl, 2-butenyl, 3-butenyl, 1,-pentenyl, 2-pentenyl, 3-pentenyl, 4-pentenyl, 1-hexenyl, 2-hexenyl, 3-hexenyl, 4-hexenyl, or 5-hexenyl; ($C_2$-$C_6$)alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl; aryl can be phenyl, indenyl, or naphthyl; and heteroaryl can be furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide).

In cases where compounds are sufficiently basic or acidic to form stable nontoxic acid or base salts, use of the compounds as salts may be appropriate. Examples of acceptable salts are organic acid addition salts formed with acids which form an anion, for example, tosylate, methanesulfonate, acetate, citrate, malonate, tartarate, succinate, benzoate, ascorbate, α-ketoglutarate, and α-glycerophosphate. Suitable inorganic salts may also be formed, including hydrochloride, phosphate, sulfate, nitrate, bicarbonate, and carbonate salts.

Acceptable salts may be obtained using standard procedures well known in the art, for example by reacting a sufficiently basic compound such as an amine with a suitable acid affording an acceptable anion. Alkali metal (for example, sodium, potassium or lithium) or alkaline earth metal (for example calcium) salts of carboxylic acids can also be made.

As used herein, a "surfactant" is a substance that even though present in relatively small amounts, can exert a marked effect on the surface behavior of a system. These agents are essentially responsible for producing great changes in the surface energy of liquid or solid surfaces, and their ability to cause these changes in the surface energy of liquid or solid surfaces is associated with their tendency to migrate to the interface between two phases. Concise Encyclopedia of Science & Technology (McGraw-Hill) 4th Ed., 1998, 1931-1932. More specifically, the surfactant functions as an adjuvant to increase detergency and/or lubricity of the composition.

The surfactant can be an anionic surfactant, a cationic surfactant, a nonionic surfactant, an amphoteric surfactant, or any combination thereof. The surfactant composition can preferably include an anionic surfactant, wherein the anionic surfactant can preferably be a phosphate ester. The surfactant composition can also preferably include a cationic surfactant, wherein the cationic surfactant can preferably be a quaternary ammonium salt. The surfactant composition can also preferably include a nonionic surfactant, wherein the nonionic surfactant can preferably be an alcohol alkoxylate (e.g., ethoxylate). In addition, the surfactant composition can also preferably include a amphoteric surfactant, wherein the amphoteric surfactant can preferably be a fatty amine derivative.

As used herein, an "anionic surfactant" is a compound containing a hydrophobic hydrocarbon moiety and a negatively charged hydrophilic moiety. Typical commercially available anionic surfactants provide either a carboxylate, sulfonate, sulfate, or phosphate group as the negatively charged hydrophilic moiety. Any commercially available anionic surfactant may be employed in the composition of the invention, provided the composition exhibits stability as a solution or a dispersion at a temperature of about 0° C. to about 8° C. Suitable exemplary anionic surfactants include, e.g., phosphate esters, alkyl sulfates, alkyl sulfonates, aromatic sulfonates, alpha-olephin sulfonates, and ether carboxylates.

As used herein, a "cationic surfactant" is a compound carrying a positive charge on the surfactants's hydrophilic portion. Usually the positive charge is on a nitrogen atom in the form of a quaternary ammonium compound, an amine salt, or an imidazoline salt. Suitable exemplary cationic surfactants include, e.g., quaternary ammoniums, amines, diamines, and amine oxides. Suitable exemplary cationic surfactant include, e.g., quaternary ammoniums, amines, diamines, and amine oxides.

As used herein, an "nonionic surfactant" is a hydrophobic compound that bears essentially no charge and exhibits a hydrophilic tendency usually due to the presence of oxygen in the molecule. Nonionic surfactants encompass a wide variety of polymeric compounds which include specifically, but not exclusively, alkoxylated (e.g., ethoxylated) alkylphenols, alkoxylated (e.g., ethoxylated) aliphatic alcohols, alkoxylated (e.g., ethoxylated) amines, alkoxylated (e.g., ethoxylated) ether amines, carboxylic esters, carboxylic amides, and polyoxyalkylene oxide block copolymers. Any desired nonionic surfactant can be employed in the composition of the invention, provided the composition exhibits stability as a solution or a dispersion at a temperature of about 0° C. to about 8° C.

As used herein, an "amphoteric surfactant" is a compound that includes both an acidic and a basic hydrophilic group. Amphoteric surfactants can include the anionic or cationic group common in anionic or cationic surfactants and additionally can include either hydroxyl or other hydrophilic groups that enhance surfactant properties. Suitable amphoteric surfactants include betaine surfactants, sulfobetaine surfactants, amphoteric imidazolinium derivatives, sarcosinates, and amino acid derivatives.

Any suitable amount of surfactant can be present in the composition, provided the composition exhibits stability as a solution or a dispersion at a temperature of about 0° C. to about 8° C. Preferably, the surfactant is present in about 2 wt. % to about 40 wt. % of the composition.

Any suitable phosphonium compound can be employed, provided the composition exhibits stability as a solution or a dispersion at a temperature of about 0° C. to about 8° C. Suitable phosphonium compounds are disclosed, e.g., in U.S. Pat. No. 4,673,509; Canadian Patent No. 2,082,994; U.S. Pat. No. 4,874,526; European Patent No. 332,578; and references cited therein.

Preferably, the phosphonium compound is a quaternary phosphonium compound. Any suitable quaternary phosphonium compound can be employed, provided the composition exhibits stability as a solution or a dispersion at a temperature of about 0° C. to about 8° C.

Preferably, the phosphonium compound is a compound of formula (I):

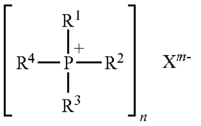

wherein $R^1$-$R^4$ are each independently $(C_1$-$C_{24})$alkyl, $(C_2$-$C_6)$alkenyl, $(C_2$-$C_6)$alkynyl, $(C_3$-$C_8)$cycloalkyl, $(C_1$-$C_{24})$alkyl$(C_3$-$C_8)$cycloalkyl, aryl, heteroaryl, $(C_1$-$C_{24})$alkyl aryl, or $(C_1$-$C_{24})$alkyl heteroaryl; wherein any alkyl, cycloalkyl, heteroaryl, or aryl of $R^1$-$R^4$ can optionally be substituted with one or more hydroxy, halo, or $(C_1$-$C_{24})$alkoxy and any aryl, heteroaryl, or cycloalkyl of $R^1$-$R^4$ can optionally be substituted with $(C_1$-$C_{24})$alkyl;

X is F, Cl, Br, I or $SO_4$, $NO_3$, rhodanide, $ClO_4$, $ICl_2$, N,N-dialkyldithiocarbamate, $CO_3$, $—S_2CHNH(CH_2)_2NHCS_2$, $[Fe(CN)_5(NO)]$, $PO_4$, $[Cu(CN)_4]$, or $[M(L)_6]$, wherein M is Fe, Co, or Mn and L is CN or rhodanide;

n is 1 to about 4; and m is 1 to about 4.

A specific value for $R^1$ is $CH_2OH$.

A specific value for $R^2$ is $CH_2OH$.

A specific value for $R^3$ is $CH_2OH$.

A specific value for $R^4$ is $CH_2OH$.

A specific value for X is $SO_4$.

A specific value for n is 2.

A specific value for m is 2.

Suitable specific quaternary phosphonium compounds include tetrakis (hydroxymethyl) phosphonium sulfate, tetrakis(hydroxymethyl) phosphonium phosphate, tetrabutyl phosphonium bromide, tetrabutyl phosphonium chloride, tributyl(tetradecyl) phosphonium chloride, trioctyl(octadecyl) phosphonium iodode, tetrakis(hydroxymethyl) phosphonium chloride, (ethoxycarbonylmethyl)triphenylphosphonium bromide, (ethoxycarbonylmethyl) triphenylphosphonium chloride, (2-hydroxyethyl) triphenylphosphonium bromide, (2-hydroxyethyl) triphenylphosphonium chloride, (methoxycarbonylmethyl)

triphenylphosphonium bromide, and (methoxycarbonylmethyl)triphenylphosphonium chloride. Preferably, the quaternary phosphonium compound is tetrakis(hydroxymethyl) phosphonium sulfate, which is commercially available as Tolcide PS200 or Tolcide PS75 from Albright & Wilson (Glen Allen, V A).

Any suitable amount of phosphonium compound can be present in the composition, provided the composition exhibits stability as a solution or a dispersion at a temperature of about 0° C. to about 8° C. Preferably, the phosphonium compound is present in about 1 wt. % to about 10 wt. % of the composition.

Any suitable carrier can be employed in the composition, provided the composition exhibits stability as a solution or a dispersion at a temperature of about 0° C. to about 8° C. Preferably, the carrier is water. In addition, the water can optionally be deionized. Alternatively, the carrier can be a water-soluble solvent. Suitable water-soluble solvents include alcohols and polyols such as ethanol, propanol, ethylene glycol, propylene glycol, or any combination thereof. In addition, the water-soluble solvent can be used alone or in conjunction with water.

The carrier can be present in any suitable amount, provided the composition exhibits stability as a solution or a dispersion at a temperature of about 0° C. to about 8° C. Preferably, the carrier is present in about 10 wt. % to about 95 wt. % of the composition.

The composition can optionally include a neutralizing agent. Any suitable neutralizing agent can be employed in the composition, provided the composition exhibits stability as a solution or a dispersion at a temperature of about 0° C. to about 8° C. Preferably, the neutralizing agent is an alkaline metal hydroxide, an alkyl amine, an organic acid, an inorganic acid, or any combination thereof. The neutralizing agent can be present in any suitable amount, provided the composition exhibits stability as a solution or a dispersion at a temperature of about 0° C. to about 8° C. Preferably, the neutralizing agent is present in an amount such that the pH of the composition is between about 4.5 and about 9.5.

The composition can optionally include a chelating agent. Where water is used as carrier, there is a tendency for the hardness cations (e.g., calcium, magnesium, and/or ferrous ions) to reduce the efficacy of the surfactants. The hardness cations can even form precipitates when coming into contact with ions such as sulfates and carbonates. Water conditioning agents (e.g., chelating agents) can be used to form complexes with the hardness ions.

Any suitable chelating agent can be employed in the composition, provided the composition exhibits stability as a solution or a dispersion at a temperature of about 0° C. to about 8° C. Suitable chelating agents include ethylene diamine tetraacetic acid, or a suitable salt thereof, diethylene triamine pentacetic acid, or a suitable salt thereof, nitrilotriacetic acid, or a suitable salt thereof, and N-hydroxyethylene diamine triacetic acid, or a suitable salt thereof. Preferably, the chelating agent is ethylene diamine tetraacetic acid (EDTA), or a suitable salt thereof. EDTA is commercially available from Dow Chemicals (Midland, Mich.).

The chelating agent can be present in any suitable amount, provided the composition exhibits stability as a solution or a dispersion at a temperature of about 0° C. to about 8° C. Preferably, the chelating agent is present in about 1 wt. % to about 10 wt. % of the composition.

Known surfactant compositions (e.g., lubricant compositions) in the industrial and institutional industry typically include water, one or more surfactants, one or more neutralizing agents, and/or one or more chelating agents. These compositions, however, have a tendency to freeze or crystallize as the temperature of the composition approaches 0° C. (e.g., from about 8° C. to about 0° C.). In addition, the compositions, upon freezing or crystallizing, require a considerable amount of heating or agitation to redissolve the crystals or melt the frozen particles.

The composition of the present invention is stable as a solution or as a dispersion at a temperature down to about 0° C. More specifically, the composition of the present invention is stable as a solution or as a dispersion at a temperature of about 0° C. to about 8° C.

As used herein "stability" refers to the tendency of a composition to remain as a solution or as a dispersion as the temperature of the composition approaches 0° C. (e.g., from about 0° C. to about 8° C.). As the temperature of a composition approaches 0° C. (e.g., from about 0° C. to about 8° C.), the composition will not undergo, to any appreciable degree, precipitation, freezing or crystallization. More specifically, as the temperature of a composition approaches 0° C. (e.g., from about 0° C. to about 8° C.), the composition will not undergo, to any appreciable degree, precipitation or crystallization. The composition may form a colloidal suspension or may form a dispersion, viewed as a cloudy white solution, but upon slight agitation or slight heating, the suspended particles will redissolve in solution.

As a result, the compositions of the present invention offer advantages over known surfactant compositions that include water, one or more surfactants, one or more neutralizing agents, and/or one or more chelating agents. Specifically, the compositions of the present invention, upon cooling to about 0° C. (e.g., from about 0° C. to about 8° C.), may form a colloidal suspension or may form a dispersion. However, the compositions of the present invention, upon cooling to about 0° C. (e.g., from about 0° C. to about 8° C.), will not freeze or produce crystals as readily as known surfactant compositions that include water, one or more surfactants, one or more neutralizing agents, and/or one or more chelating agents. As such, the compositions of the present invention will require less agitation or will require less heating, than known surfactant compositions that include water, one or more surfactants, one or more neutralizing agents, and/or one or more chelating agents, to redissolve the suspended particles in solution.

As used herein, a "dispersion" refers to a system of minute particles (solid, liquid, or gaseous) distinct and separate from one another and suspended in a liquid, gaseous, or liquid medium. A dispersion can also generally refer to colloidal particles suspended in a medium.

The surfactant composition of the present invention is useful in the industrial and institutional industry as a lubricant composition. Preferably, the lubricant composition is an antimicrobial lubricant. More specifically, the lubricant composition can be an antimicrobial lubricant composition useful for lubricating containers, rinsing, lubricating, and antistatic compositions. The lubricant composition can be employed in the transportation and storage of compositions. More specifically, the lubricant composition can be employed in the transportation of compositions in unheated trucks and in the storage of compositions in unheated rooms (e.g., sheds or warehouses).

The composition of the present invention can be formulated in any suitable manner, provided each of the components maintains its stability during and after the formulation process and provided the composition exhibits stability as a solution or a dispersion at a temperature of about 0° C. to about 8° C. In the event some of the components of the composition are incompatible in a concentrated form, the composition can be formulated at use-level concentrations by combining two or more formulated component concentrates. Preferably, each of the surfactant and phosphonium compound, in any order, are contacted with the carrier. More preferably, each of the above components are added to the carrier, in any order. The resulting mixture can then be heated, stirred, shaken, or agitated to facilitate each of the components effectively dissolving in the carrier.

The composition of the present invention is particularly useful as a surfactant, a lubricant, a rinsing agent, a cleaning agent, an antistatic agent, or any combination thereof. As such, the present invention provides a process for lubricating a container. The process includes contacting at least a portion of a surface of the container and a composition of the present invention together. Preferably, a portion of a surface of the container is contacted with the composition.

The present invention also provides a process for lubricating a conveyor. The process includes contacting at least a portion of a surface of the conveyor and a composition of the present invention together. Preferably, a portion of a surface of the conveyor is contacted with the composition.

The container is preferably a beverage container. In addition, the container is preferably made from polyethylene terephthalate.

The surface of the container or the surface of the conveyor can be contacted with the composition in any suitable manner. The composition can be applied to the surface, for example, by brushing the surface with the composition, by spraying (e.g., with the use of a spray ball) the surface with the composition, by wiping the surface with the composition, by soaking the surface with the composition, or any combination thereof. The size and shape of the surface to be contacted can influence the manner in which the surface can be contacted with the composition. As such, it may be more effective to spray the surface of a conveyor with the composition while it may be more effective to wipe, brush or soak the surface of a container with the composition.

The composition of the present invention can optionally be diluted with one or more carriers (e.g., water or a water soluble solvent), prior to use. The specific carrier and the amount thereof will typically depend upon the specific components of the composition, the amount thereof, as well as the utility of the composition. For example, when the composition is directly applied to the surface of a conveyor, the composition will typically include ethylenediaminetetraacetic acid; a phosphate ester; a quaternary ammonium salt; an alcohol alkoxylate; an alkaline metal hydroxide or an alkyl amine; and tetrakis(hydroxymethyl) phosphonium sulfate; or a suitable salt thereof, and water up to about 95 wt. %, up to about 75 wt. %, or up to about 50 wt. % of the composition.

The present invention will now be illustrated by the following non-limiting Examples.

EXAMPLES

Example 1

1. Solution #1

| | active % | % solution |
|---|---|---|
| Deionized (DI) water | 100.00% | 65.10% |
| tetrasodium EDTA PWD 4 H2O | 82.00% | 4.90% |
| polyethylene phenol ether phosphate | 100.00% | 2.50% |
| complex organo phosphate ester | 100.00% | 12.50% |

-continued

| | active % | % solution |
|---|---|---|
| didecyl dimethyl ammonium chloride | 50.00% | 5.00% |
| linear alcohol 60-70% ethoxylate Neodol 25-7 | 100.00% | 8.00% |
| sodium hydroxide 50% | 50.00% | 2.00% |
| Total | | 100.00% |

2. Effect of Tolcide PS 75 on Cold Temperature Stability of Solution #1

The analysis examined the cold temperature stability of solution #1 with varied amounts of Tolcide PS 75, which were added on top of the #1 solution. Additions of 2%, 4%, and 6% were tested at 40° F. (4° C.) for cold temperature stability. The results can be found in the table below.

TABLE 1

Cold temperature stability results for solution #1 with added amounts of Tolcide PS 75 (Run #1).

| Solution | Cold Temperature Formation of Precipitate | Cold Temperature Precipitate Description |
|---|---|---|
| Solution #1 | Precipitate formed after nine days | White Crystals in ⅓ of Solution |
| Solution #1 w/ Additional 2% Tolcide PS 75 | Precipitate formed after six days | White powder-like precipitate on bottom (trace amount) |
| Solution #1 w/ Additional 4% Tolcide PS 75 | No Precipitate formed in the testing period of two weeks | N/A |
| Solution #1 w/ Additional 6% Tolcide PS 75 | Precipitate formed after six days | White powder-like ppt on bottom, trace amounts |

TABLE 1

Cold temperature stability results for solution #1 with added amounts of Tolcide PS 75 (Run #2).

| Solution | Cold Temperature Formation of Precipitate | Cold Temperature Precipitate Description |
|---|---|---|
| Solution #1 | Precipitate formed after nine days | White Crystals in ⅓ of Solution |
| Solution #1 w/ Additional 2% Tolcide PS 75 | Trace amount of precipitate formed after six days | White powder-like precipitate on bottom (trace amount) |
| Solution #1 w/ Additional 4% Tolcide PS 75 | Trace amount of precipitate formed in the testing period of two weeks | White powder-like precipitate on bottom (trace amount) |

The results indicate that the addition of Tolcide PS 75 significantly reduced or inhibited the solid precipitation in solution #1 at low temperature (e.g., about 4° C.).

Example 2

1. Solution #2

| | active % | % solution |
|---|---|---|
| DI water | 100.00% | 70% |
| tetrasodium EDTA PWD 4 H2O | 82.00% | 5% |

-continued

| | active % | % solution |
|---|---|---|
| complex organo phosphate ester | 100.00% | 12% |
| linear alcohol 60-70% ethoxylate Neodol 25-7 | 100.00% | 5% |
| sodium hydroxide, 50% | 50.00% | 2% |
| Tolcide PS75 | 75% | 4% |
| Tall oil fatty acid | 100% | 2% |
| Total | | 100% |

2. Effect of Tolcide PS 75 on Cold Temperature Stability of Solution #2

The solution cold temperature stability of solution #2 was tested at 40° F., for 27 days. No precipitates were observed even after the solution was seeded on day 13 with a trace amount of crystal precipitated from formula 1.

The result indicates that the surfactant solution containing Tolcide PS75 exhibited a good cold temperature stability.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A composition comprising a surfactant, a phosphonium compound selected from the group consisting of tetrakis(hydroxymethyl) phosphonium sulfate, tetrakis(hydroxymethyl) phosphonium phosphate, tetrakis(hydroxymethyl) phosphonium chloride, and combinations thereof, and a carrier; the phosphonium compound is present in the composition at a sufficient quantity such that the composition exhibits stability as a solution at a temperature of about 0° C. to about 8° C.

2. The composition of claim 1 wherein the surfactant is present in about 2 wt. % to about 40 wt. % of the composition.

3. The composition of claim 1 wherein the phosphonium compound is present in about 1 wt. % to about 10 wt. % of the composition.

4. The composition of claim 1 wherein the carrier is water.

5. The composition of claim 1 wherein the carrier is present in about 10 wt. % to about 95 wt. % of the composition.

6. The composition of claim 1, wherein the surfactant is an anionic surfactant, a cationic surfactant, a nonionic surfactant, an amphoteric surfactant, or a combination thereof.

7. The composition of claim 6 wherein the surfactant comprises an anionic surfactant that is a phosphate ester.

8. The composition of claim 6 wherein the surfactant comprises a cationic surfactant that is a quaternary ammonium salt.

9. The composition of claim 6 wherein the surfactant comprises a nonionic surfactant that is an alcohol alkoxylate.

10. The composition of claim 6 wherein the surfactant comprises an amphoteric surfactant that is a fatty amine derivative.

11. The composition of claim 1 wherein the composition further comprises a neutralizing agent.

12. The composition of claim 11 wherein the neutralizing agent is present in an amount such that the pH of the composition is between about 4.5 and about 9.5.

13. The composition of claim 11 wherein the neutralizing agent is an alkaline metal hydroxide, an alkyl amine, an organic acid, an inorganic acid, or any combination thereof.

14. The composition of claim 1 further comprising a chelating agent.

15. The composition of claim 14 wherein the chelating agent is present in about 1 wt. % to about 10 wt. % of the composition.

16. The composition of claim 14 wherein the chelating agent is ethylenediaminetetraacetic acid, or a suitable salt thereof.

* * * * *